July 15, 1952  A. J. McEWAN  2,603,696

TEST MEANS FOR AIRCRAFT GYRO-CONTROLLED ATTITUDE INDICATOR

Filed Oct. 4, 1951  3 Sheets-Sheet 1

INVENTOR.
ARCHIBALD J. McEWAN
BY
Walter S. Pawl
ATTORNEYS

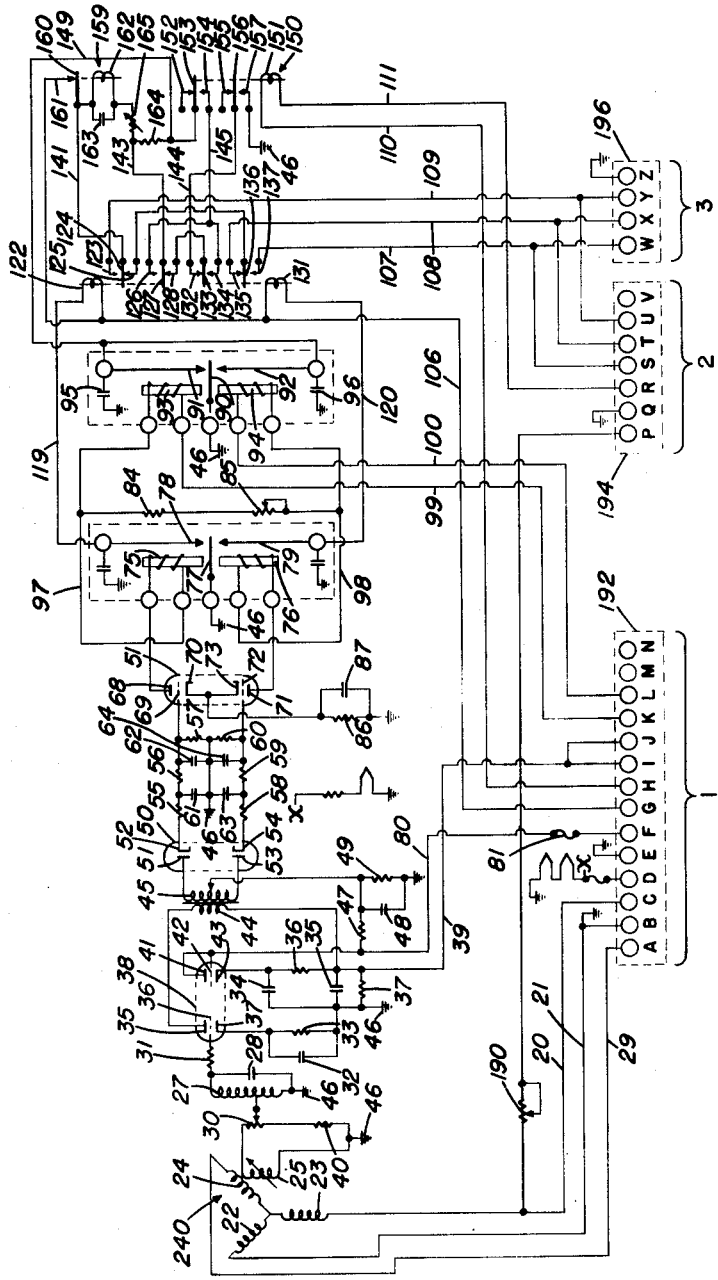

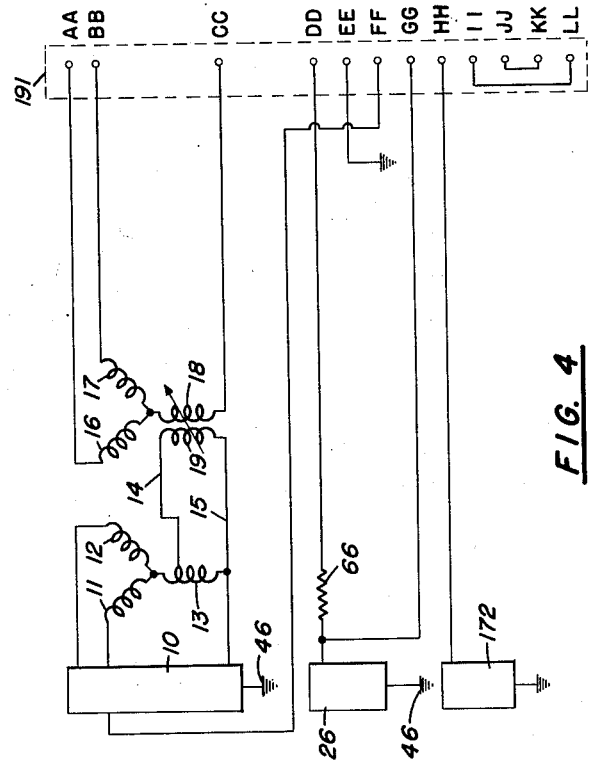
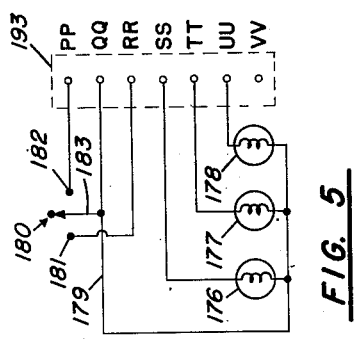
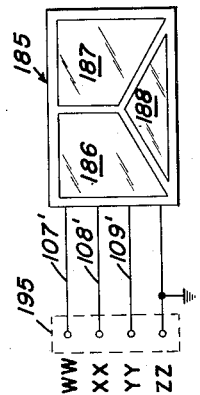
INVENTOR.
ARCHIBALD J. McEWAN
BY
ATTORNEYS

Patented July 15, 1952

2,603,696

UNITED STATES PATENT OFFICE 2,603,696

TEST MEANS FOR AIRCRAFT GYRO-CONTROLLED ATTITUDE INDICATOR

Archibald John McEwan, United States Navy

Application October 4, 1951, Serial No. 249,793

12 Claims. (Cl. 177—311)

(Granted under the act of March 3, 1883, as amended April 30, 1928; 370 O. G. 757)

This invention relates to testing apparatus, and more particularly to testing apparatus suitable for use with the aircraft gyro-controlled attitude indicator described and claimed in my co-pending application Serial No. 166,951, filed 8 June 1950.

One of the objects of the invention is to provide new and improved testing apparatus.

Another object is to provide new and improved testing apparatus for quickly and conveniently calibrating an attitude indicator.

Other objects and advantages will become apparent after a consideration of the following specification when taken in connection with the accompanying drawings, in which:

Fig. 3 is an electrical circuit diagram of the attitude indicator showing the electrical connector terminals for connecting the test apparatus;

Fig. 4 is an electrical circuit diagram of suitable gyroscope apparatus and power supplies;

Fig. 5 is an electrical circuit diagram of the pilot's indicator; and

Fig. 6 is an electrical circuit diagram of the wing indicator lights.

Figure 1:
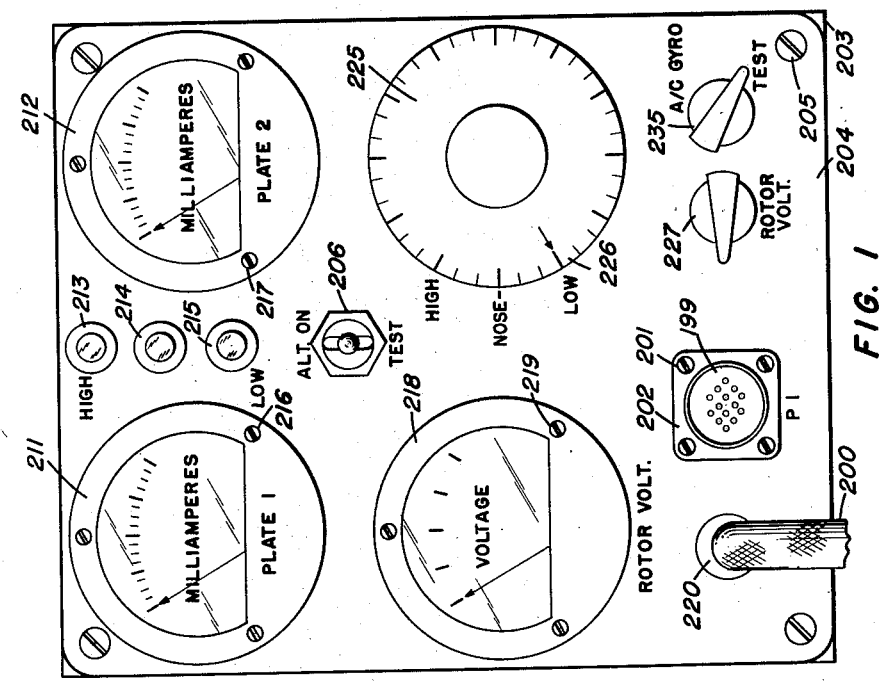
Fig. 1 is a front elevational view of the testing apparatus.

Referring now to the drawings, in which like reference characters are used throughout to designate like parts, and more particularly to Figs. 3, 4, 5, and 6 thereof, the circuits and operation of the attitude indicator apparatus itself will first be described to form a basis for a more proper understanding of the operation of the testing apparatus. There is shown at 10, Fig. 4, a power supply of any convenient design for providing a three phase alternating current voltage, of, for example, 26 v., 400 cycles/sec. The power supply has one terminal connected to ground 46, and three terminals thereof connected to the Y-connected coils 11, 12, and 13 of a suitable gyroscope motor. A tapped portion of coil 13 is connected by way of leads 14 and 15 to energize coil 19, which is inductively coupled to coil 18 of a pitch autosyn device and which includes coils or windings 16 and 17 Y-connected thereto. The outer terminals of coils or windings 16, 17, and 18 are respectively connected to the terminals AA, BB, and CC of multiple terminal plug 191, which is adapted to fit with jack 192, Fig. 3, while the apparatus is being used for attitude indication. Plug 191 is removed, and replaced by another plug, when the apparatus is to be tested, as will be hereinafter more fully apparent.

One phase of the 26 v. A. C. voltage from supply 10 is applied to plug terminal FF, as shown.

Another power supply 26 is also shown, for providing a suitable D. C. source of, for example, 28 volts to ground. The output terminal of supply 26 is directly connected to terminal GG of plug 191, and is also connected by way of resistor 66 to terminal DD of plug 191. Any suitable switch, not shown, may be inserted in the lead to GG to permit on-off control of the lights without deenergizing the amplifier.

Terminal EE of plug 191 is connected to ground, as shown. Terminal HH is connected to an altitude device 172 of any suitable design and which is constructed and arranged to generate an output signal when the altitude of the aircraft falls below a predetermined value.

Terminals II and LL of plug 191 are connected together, and terminals JJ and KK are connected together, as shown.

Particular reference is made now to Fig. 3. Terminal A of aforementioned jack 192 is connected by way of lead 29 to the outer terminal of coil or winding 24 of a zero set autosyn generally designated 240, which includes Y-connected thereto coils or windings 22 and 23. The outer terminal of winding 22 is connected by way of lead 21 to terminal B of jack 192, and the outer terminal of coil 23 is connected by way of lead 20 to terminal C of jack 192.

Lead 20 is also connected by way of variable resistor 190 to terminal P of an additional jack 194, for purposes to be hereinafter explained. The zero set of autosyn 240 is provided by adjusting the relative positions of coils 22, 23, and 24 with respect to a coil or winding 25, any suitable means, not shown, being provided for this purpose. Coil 25 applies its output across the series connected resistor 40 and potentiometer 30. The arm of potentiometer 30 is connected to a suitable tap or inductor 27, which has one end thereof connected to ground 46, and the other end thereof connected by way of resistor 31 to the control grid 36 of the first triode section of a dual triode tube 38. The cathode 37 of the first tube section is connected by way of resistor 33 to ground 46, the resistor 33 having capacitor 32 connected in shunt therewith. The anode 35 of the first tube section is connected to one terminal of the primary 44 of a transformer having center-tapped secondary 45, the other terminal of the primary 44 being connected by way of lead 39 to terminals I and J of jack 192. Lead 39 is connected by way of resistor 37 to ground 46, resistor 37 having capacitor 35 connected in shunt therewith. Lead 39 is also connected by way of resistor 36 to the cathode 43 of the second triode section. Cathode 43 is connected to ground 46 by way of capacitor 34.

The center tap of the aforementioned secondary 45 is connected by way of resistor 49 to ground, resistor 49 having capacitor 48 connected in shunt therewith. The aforementioned center tap is also connected by way of resistor 47, leads 80, and fuse 81 to terminal F of jack 192. Lead 80 is connected as shown to anode 41 and grid 42 of the second tube section of dual triode 38.

The ends of the aforementioned center-tapped secondary 45 are connected to the anodes 51 and 53 of the diode sections of a dual diode tube 50. Cathode 52 is connected by way of series connected resistors 55 and 56 to the control grid 69 of a triode having anode 68 and cathode 70. Aforementioned cathode 54 is connected by way of series connected resistors 58 and 59 to the control grid 72 of a triode having anode 71 and cathode 73. The two last named triodes preferably have similar characteristics.

The junction between resistors 55 and 56 is connected by way of capacitor 61 to ground 46, and the junction between resistors 58 and 59 is connected by way of capacitor 63 to ground 46. Grid 69 is connected by way of resistor 57 to ground, resistor 57 having capacitor 62 in shunt therewith, and grid 72 is connected by way of resistor 60 to ground, resistor 60 having capacitor 64 connected in shunt therewith.

The aforementioned cathodes 70 and 73 are connected together and by way of resistor 86 to ground. Resistor 86 has capacitor 87 connected in shunt therewith.

The aforementioned anode 68 is connected to one terminal of one winding 75 of a first differential relay, the other terminal of winding 75 being connected by way of lead 97 to one terminal of the first winding 93 of a second differential relay. The other terminal of winding 93 is connected by way of lead 99 to terminal K of aforementioned jack 192.

Anode 71 is connected to one terminal of the second winding 76 of the aforementioned first differential relay. The other terminal of winding 76 is connected by way of lead 98 to one terminal of the second winding 94 of the second aforementioned differential relay, the other terminal of winding 94 being connected by way of lead 100 to terminal L of jack 192. Leads 97 and 98 are connected together by way of the series connected resistors 84 and 85, resistor 85 preferably being variable.

The movable armature 77 of the first mentioned differential relay is connected to ground 46. One contact 78 of the differential relay is connected by way of lead 119 to one terminal of the winding 122 of a multiple relay having armatures 124 and 127. The other terminal of winding 122 is connected by way of lead 106 to post G of jack 192. The other contact 79 of the first differential relay is connected by way of lead 120 to one terminal of the winding 131 of a second multipole relay having armatures 136 and 133. The other terminal of the winding 131 is connected to lead 106. Armatures 124 and 127 are adapted to be moved upward, Fig. 3, when coil 122 is energized. Armature 124 has associated therewith contacts 123 and 125, and armature 127 has associated therewith contacts 126 and 128.

Armatures 136 and 133 are adapted to be moved down, Fig. 3, when winding 131 is energized. Armature 136 has associated therewith contacts 135 and 137, and armature 133 has associated therewith contacts 132 and 134.

Contact 137 is connected by way of lead 107 to terminal S of jack 194 and terminal W of jack 196. Contact 135 is connected by way of lead 108 to terminal T of jack 194 and terminal X of jack 196. Armature 136 is connected to contact 125. Contact 134 is connected to contact 126 and by way of lead 145 to contact 154 of a multipole relay generally designated 150, having winding 151, and having in addition to the aforementioned contact 154, contact 152, armature 153, contact 155, armature 156, and contact 157. Coil 151 is adapted to be energized by the altitude signal from altitude device 172.

Aforementioned armature 133 is connected to contact 128. Contact 132 is connected by way of lead 144 to armature 156. Armature 127 is connected by way of lead 143 and variable resistor 165 to a blinker circuit comprising capacitor 163 and coil 162 connected in parallel therewith. Coil 162 has one end thereof connected to the aforementioned resistor 165, and the other end thereof connected to armature 160 and by way of lead 141 to armature 124. Contact 123 is connected by way of lead 109 to terminal U of jack 194 and terminal Y of jack 196. Contact 161 of the aforementioned blinker circuit is connected to lead 106.

Lead 143 is connected by way of resistor 164 and lead 149 to contacts 92 and 91 of the aforementioned second differential relay, contacts 92 and 91 having associated therewith armature 90 which is connected to ground.

Contact 157 of the aforementioned altitude signal relay 150 is connected to ground 46, while contacts 152 and 155 are open.

Terminal E of jack 192 is connected to ground, while terminal D is connected by way of the series parallel connected tube filaments to ground.

Terminal Q of jack 194, and terminal Z of jack 196, are both connected to ground.

Particular reference is made now to Fig. 5 in which is shown the pilot's indicator, the plug 193 being adapted to cooperate with jack 194. Three signal lamps 176, 177, and 178 each have one terminal thereof connected to terminals SS, TT, and UU respectively, and all have the other terminal thereof connected by way of lead 179 to terminal QQ, and also to the blade 183 of a single pole double throw switch generally designated 180. Terminal 181 of the switch 180 is connected to terminals RR, while terminal 182 of the switch 180 is connected to terminals PP.

In Fig. 6 is shown the wing lamp circuit for the wing lamp generally designated 185, and having three lamps of different colors, green, amber, and red, connected by leads to terminals WW, XX, YY, and ZZ.

In the operation of the above-described apparatus, assume that plug 191 is fitted with jack 192, plug 193 with jack 194, and plug 195 with jack 196, thereby forming a complete electrical circuit.

The output of the pitch gyro is fed into the zero set autosyn. These may be any conventional design, it being understood that the electrical take-off is along the pitch axis, and that means, not shown, is provided for adjusting the pitch angle which it is desired to use for reference. The output of the zero set autosyn is coupled to the grid 36 of the triode voltage amplifier. The output of this amplifier is transformer coupled by way of the transformer including primary 44 and center-tapped secondary 45 to the dual triode 50.

As aforedescribed, one phase of the three phase A.-C. supply voltage is supplied to lead 80, and an A.-C. voltage drop is developed across resistor 49, which is applied to the center tap of secondary 45. Accordingly, a phase sensitive arrangement is provided, so that the diode sections of tube 50 are selectively rendered relatively more conducting depending upon the phase relation between the voltage on primary 45 and that on resistor 49. The outputs of the diodes become unbalanced depending upon whether the pitch angle of the aircraft changes above or below the desired values, and the rectified outputs are substantially proportional to the amount of deviation.

It will be understood that terminals are suitably chosen so that, when the aircraft noses down, the current in winding 75 exceeds that in winding 76, and relay 122 is energized while 131 remains deenergized. These rectified outputs are amplified by the triode sections respectively of tube 51, and applied to the windings 75 and 76 respectively of a first differential relay, and to the windings 93 and 94 respectively of a second differential relay, rectified D. C. plate voltage for both anodes 68 and 71 being obtained from the cathode 43 of tube 38 by way of leads 39, 99, and 100.

The first micropositioner or polarized relay selectively actuates relays 122 and relay 131 which in turn, by way of leads 107, 108, and 109, result in the energization of the proper bulbs in the approach light indicator and pilot's indicator, the amber lamp burning while the aircraft is in the correct approach attitude and the armature 77 of the first differential relay is in neutral position, a nose-up attitude causing the green lamp to burn, and a nose-down attitude causing the red lamp to burn.

When the differential current attains a predetermined value, the second differential relay is energized to complete the circuit between lead 149 and ground 46, thereby placing the blinker circuit (consisting of the winding 162 of relay 159, the capacitor 163, resistor 164 which may have a value of 820 ohms, and the potentiometer 165) in operation. The operation of this relay 159 periodically interrupts the 24 or 28 volt supply to the various approach lights, depending upon the instant positions of the contacts of the other relays, with the result that when the nose-up and nose-down attitudes approach an extreme condition the respective lamps begin to blink at a relatively slow rate.

Assume now by way of description that the aircraft drops below a predetermined altitude, and that the altitude device 172 applies a signal to relay 150, energizing the relay. This relay, while energized, alters the aforedescribed blinker circuit through armature 156, contact 132 of relay 131, armature 133, contact 128 of relay 122, and armature 127. The result of this operation causes the amber light to blink (if it is illuminated) at a fast rate. Similarly, the red or green lamps occult at a fast rate, corresponding to the fast rate of the amber lamp.

Accordingly, it is seen that apparatus is provided in which, for normal landing in which the aircraft has the proper attitude and altitude, the amber light is illuminated. If the altitude remains as desired, but the plane noses-up, the amber light will go out and the green light will come on; if the plane noses-down from the normal attitude, the amber light goes out and the red light 167 comes on. If the deviations become excessive, these lights begin to blink at a slow rate. If the altitude falls below a safe value, the amber lamp will blink at a fast rate even when the attitude is correct; if the attitude becomes such that the nose-up or nose-down is excessive, the lamps will flicker at a fast rate if the altitude falls too low.

Figure 2:
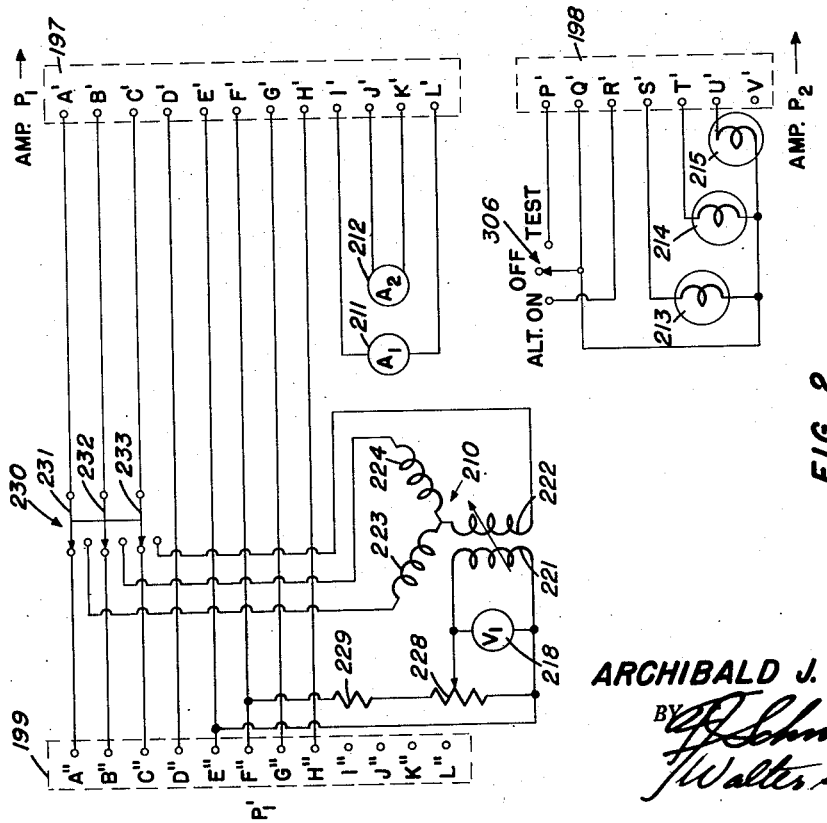
Fig. 2 is an electrical circuit diagram of the testing apparatus of Fig. 1.

Particular reference is made now to Figs. 1 and 2, in which a front panel view and an electrical circuit diagram respectively of the test apparatus are shown. The test set may include a housing 203 having a panel 204 mounted thereon and held in place as by screws 205. Panel 204 has mounted thereon three lamps 213, 214, and 215 which are respectively green, amber, and red, and which, when illuminated, indicate a test condition simulating nose-up, on, and nose-down respectively. Mounted directly below the aforementioned lamp is a test switch 206 which is provided for purposes to be subsequently apparent. On either side of switch 206 are mounted a pair of milliameters 211 and 212 preferably having similar full scale values, and held in place by screws 216 and 217 respectively.

A voltmeter having a suitable full scale value of, for example, 30 volts, is provided, and held in place as by screws 219.

A cable 200, which it is understood contains all the leads to the two plugs 197 and 198, Fig. 2, enters the test unit through gromet 220. A support 202, held in place as by screws 201, provides a mounting for jack or socket 199.

A knob 227 controls the position of the arm of potentiometer 228, Fig. 2. Knob 235 controls the setting of the triple pole double throw switch generally designated 230, Fig. 2.

The dial 225, and its accompanying scale 226, Fig. 1, controls the degree of coupling between coils or windings 221 and 222, Fig. 2.

In using the test set, plug 191, Fig. 4, is removed from socket 192, Fig. 3, and placed in socket 199, Fig. 2. Plug 193 is removed from socket 194. Plugs 197 and 198 are then placed in sockets 192 and 194 respectively, and the test apparatus is ready for use.

The test switch 180 of Fig. 5 and 306 of Fig. 2, when operated, place resistor 190, Fig. 3, across two legs of the autosyn input. This electrically unbalances the three coil stator a predetermined amount depending upon the instant setting of variable resistor 190. Thus by using the caged position of the gyro as a reference, it is a simple matter to unbalance a sufficient amount to cause the amber lamp to light in the caged gyro position. This automatically measures the angle between the caged gyro position and the correct flight attitude of the aircraft.

In using the test apparatus of Figs. 1 and 2, with the test set inserted and the selector switch 230 in its "aircraft gyro" setting as positioned by knob 235, the indicating apparatus operates in its normal manner, with the exception that the plate current meters 211 and 212 of the test set are connected in series with the plates or anodes 71 and 68 respectively of dual triode tube 51, Fig. 3. Switching the selector switch 230 to the "test" setting disconnects the aircraft gyro and inserts the output of selsyn generally designated 210, Fig. 2, and having windings 222, 223, and 224. By exciting the rotor 221 of the selsyn 210 with a suitable voltage, as read on voltmeter 218, the output of the selsyn 210 preferably bears a fixed relation to that of the aircraft gyro in such a manner that a one-degree rotation of the selsyn dial 225 is equivalent to one degree variation in pitch of the gyro. It thus becomes a simple matter to set the correct attitude indications for the particular aircraft under consideration. Knowing the angles of attack of the horizontal reference line of the aircraft at approach power of 5%, 10%, and 15% above stall speed, the attitude indicator can be calibrated as follows; for example, with reference attitude established at 10% above stall speed:

1. Set indicator dial 225 of selsyn 210 at correct angle of attack for 10% above the stall speed condition.
2. Adjust zero set control on autosyn 240 for an amber light (balanced plate current meter readings).
3. Adjust sensitivity control 30 until amber lamp is two degrees wide, that is, plus or minus one degree from correct approach path.
4. Adjust deviation control 85 until the red and green lamps blink at 5% and 15% above stall speed points respectively.
5. Check operation of altimeter switch.
6. Cage gyro (this excites the red lamp) and with test switch pressed, adjust calibrate control until amber lamp is excited.
7. Release test button and uncage gyro.

Obviously many modifications and variations of the present invention are possible in the light of the above teachings. It is therefore to be understood that within the scope of the appended claims the invention may be practiced otherwise than as specifically described The invention described herein may be manufactured and used by or for the Government of the United States of America for governmental purposes without the payment of any royalties thereon or therefor.

I claim:

1. Test apparatus of the character disclosed for use in conjunction with indicating apparatus on aircraft for indicating to an operator a plurality of aircraft flight conditions including variations in the attitude of the aircraft, wherein the indicating apparatus includes adjustable gyroscope means for obtaining a signal output having signal characteristics corresponding to and determined by the direction of deviation of the instant pitch angle of the aircraft from a preselected pitch angle, and also having signal characteristics corresponding to and determined by the direction of deviation of the instant pitch angle of the aircraft from a preselected pitch angle, and also having signal characteristics corresponding to and determined by the amount of said deviation, a plurality of indicating lamps, a source of potential for said lamps, relay means having contacts, circuit means interconnecting the contacts of said relay means, said source of potential, and said lamps, said relay means having said signal output applied thereto for controlling the application of said potential to said lamps, said relay means being constructed and arranged to utilize said signal characteristics to selectively energize said lamps in predetermined manners in accordance with variations in said pitch angle, in combination, an additional source of potential, and adjustable signal generating means energized from said additional source of potential and detachably connected to said indicating apparatus for creating a signal simulating the signal output of the gyroscope means under predetermined attitude conditions and pitch angle deviations of the aircraft, the relay means of said indicating apparatus being additionally characterized as including at least two variable circuit elements to permit calibration of the indicating apparatus in accordance with the simulating signal.

2. Testing apparatus for use with aircraft attitude indicating apparatus in which means is employed for obtaining a signal having a polarity corresponding to the direction of deviation of the instant pitch angle of the aircraft from a preselected pitch angle, and having a magnitude proportional to the amount of said deviation, a plurality of indicating lamps, a source of potential for said lamps, and circuit means including relay means having said signal applied thereto for controlling the application of said potential to said lamps, in combination, an additional source of potential, and adjustable signal generating means energized from said additional source of potential and detachably connected to said indicating apparatus for creating a signal simulating the signal of the indicating apparatus under preselected attitude conditions and pitch angle deviations of the aircraft, the circuit means of said indicating apparatus being additionally characterized as including at least two variable circuit elements to permit calibration of the indicating apparatus in accordance with the simulating signal.

3. In apparatus of the character disclosed for use on aircraft, in combination, gyroscope means mounted on the aircraft for obtaining a signal having a polarity corresponding to the direction of deviation of the instant pitch angle of the aircraft from a preselected pitch angle, and having a magnitude proportional to the amount of said deviation, pitch indicating apparatus including a plurality of lamps and detachably connected to said gyroscope means, said indicating apparatus while connected to the gyroscope means being constructed and arranged to utilize said signal to energize the lamps selectively in accordance with the amount and direction of deviation of the aircraft from said preselected pitch angle, and signal simulating means adapted to be detachably connected to the indicating apparatus, said indicating apparatus including a plurality of variable circuit elements for calibrating the indicating apparatus while the signal simulating means is connected thereto.

4. In apparatus of the character disclosed for use on aircraft, in combination, gyroscope means mounted on the aircraft for obtaining a signal having a polarity corresponding to the direction of deviation of the instant pitch angle of the aircraft from a preselected pitch angle, and having a magnitude proportional to the amount of said deviation, said gyroscope means including a source of A. C. potential, pitch indicating apparatus including a plurality of lamps and detachably connected to said gyroscope means, said indicating apparatus being so constructed and arranged that, while connected to the gyroscope means, said signal is utilized to energize the lamps selectively in accordance with the amount and direction of deviation of the aircraft from said preselected pitch angle, and detachable signal simulating means adapted to be interconnected between the gyroscope means and the indicating apparatus, said signal simulating means including a variable signal source energized from said source of A. C. potential, said indicating apparatus including a plurality of variable circuit elements for calibrating the indicating apparatus while the signal simulating means is connected thereto.

5. In apparatus of the character disclosed for use on aircraft, in combination, gyroscope means mounted on the aircraft for obtaining a signal having a polarity corresponding to the direction of deviation of the instant pitch angle of the aircraft from a preselected pitch angle, and having a magnitude proportional to the amount of said deviation, said gyroscope means including a source of A. C. potential, pitch indicating apparatus including a plurality of lamps and detachably connected to said gyroscope means, said indicating apparatus being so constructed and arranged that, while connected to the gyroscope means, said signal is utilized to energize the lamps selectively in accordance with the amount and direction of deviation of the aircraft from said preselected pitch angle, and detachable signal simulating means adapted to be interconnected between the gyroscope means and the indicating apparatus, said signal simulating means being energized from said source of A. C. potential and including a selsyn device having a variable coupling ratio to provide a variable signal source, said indicating apparatus including a plurality of variable circuit elements for calibrating the indicating apparatus while the signal simulating means is connected thereto.

6. In apparatus of the character disclosed for use on aircraft, in combination, gyroscope means mounted on the aircraft for obtaining a gyroscope signal having a polarity corresponding to the direction of deviation of the instant pitch angle of the aircraft from a preselected pitch angle, and having a magnitude proportional to the amount of said deviation, said gyroscope means including a source of A. C. potential, pitch indicating apparatus including a plurality of lamps and detachably connected to said gyroscope means, said indicating apparatus being so constructed and arranged that, while connected to the gyroscope means, said gyroscope signal is utilized to energize the lamps selectively in accordance with the amount and direction of deviation of the aircraft from said preselected pitch angle, and detachable signal simulating means adapted to be interconnected between the gyroscope means and the indicating apparatus, said signal simulating means being energized from said source of A. C. potential and including a selsyn device having a variable coupling ratio to provide a variable calibrating signal, said signal simulating means including switching means for selectively switching said calibrating signal and gyroscope signal into said indicating apparatus, said indicating apparatus including a plurality of variable circuit elements for calibrating the indicating apparatus while the signal simulating means is connected thereto.

7. Apparatus according to claim 6 wherein said signal simulating means includes a plurality of additional lamps corresponding respectively to the plurality of lamps in said indicating apparatus said additional plurality of lamps being energized simultaneously with the other lamps respectively and providing a convenient indication for an operator calibrating the instrument.

8. In apparatus of the character disclosed for use on aircraft, in combination, gyroscope means including an adjustable zero set autosyn mounted on the aircraft for obtaining a gyroscope signal having a polarity corresponding to the direction of deviation of the instant pitch angle of the aircraft from a preselected pitch angle, and having a magnitude proportional to the amount of said deviation, said gyroscope means including a source of A. C. potential and a source of D. C. potential, pitch indicating apparatus including relay means and a plurality of lamps and detachably connected to said gyroscope means, said indicating apparatus being so constructed and arranged that, while connected to the gyroscope means, said gyroscope signal is utilized to control the relay means and selectively connect said lamps to said D. C. source, in accordance with the amount and direction of deviation of the aircraft from said preselected pitch angle, and detachable signal simulating means adapted to be interconnected between the gyroscope means and the indicating apparatus, said signal simulating means being energized from said source of A. C. potential and including a selsyn device having a variable coupling ratio to provide a variable calibrating signal, said signal simulating means including switching means for selectively switching said calibrating signal and gyroscope signal into said indicating apparatus, said indicating apparatus including a plurality of variable circuit elements for calibrating the indicating apparatus while the signal simulating means is connected thereto.

9. In apparatus of the character disclosed for use on aircraft, in combination, gyroscope means including an adjustable zero set autosyn mounted on the aircraft for obtaining a gyroscope signal having a polarity corresponding to the direction of deviation of the instant pitch angle of the aircraft from a preselected pitch angle, and having a magnitude proportional to the amount of said deviation, said gyroscope means including a source of A. C. potential and a source of D. C. potential, pitch indicating apparatus including relay means and a plurality of lamps and detachably connected to said gyroscope means, said indicating apparatus being so constructed and arranged that, while connected to the gyroscope means, said gyroscope signal is utilized to control the relay means and selectively connect said lamps to said D. C. source, in accordance with the amount and direction of deviation of the aircraft from said preselected pitch angle, and detachable signal simulating means adapted to be interconnected between the gyroscope means and the indicating apparatus, said signal simulating means being energized from said source of A. C. potential and including a selsyn device having a variable coupling ratio to provide a variable calibrating signal, said signal simulating means including switching means for selectively switching said calibrating signal and gyroscope signal into said indicating apparatus, said indicating apparatus including a plurality of variable circuit elements for calibrating the indicating apparatus while the signal simulating means is connected thereto, said signal simulating means also including a plurality of additional lamps corresponding respectively to the plurality of lamps in said indicating apparatus, said additional plurality of lamps being energized simultaneously with the other lamps respectively and providing a convenient indication for an operator calibrating the instrument.

10. In apparatus of the character disclosed for use in aircraft, in combination, gyroscope means including an adjustable zero set autosyn mounted on the aircraft for obtaining a gyroscope signal having a polarity corresponding to the direction of deviation of the instant pitch angle of the aircraft from a preselected pitch angle, and having a magnitude proportional to the amount of said deviation, said gyroscope means including a source of A. C. potential and a source of D. C. potential, pitch indicating apparatus including relay means and three lamps of different colors and detachably connected to said gyroscope means, said indicating apparatus being so constructed and arranged that, while connected to the gyroscope means, said gyroscope signal is utilized to control the relay means and selectively connect said lamps to said D. C. source, in accordance with the amount and direction of deviation of the aircraft from said preselected pitch angle, and detachable signal simulating means adapted to be interconnected between the gyroscope means and the indicating apparatus, said signal simulating means being energized from said source of A. C. potential and including a selsyn device having a variable coupling ratio to provide a variable calibrating signal, said signal simulating means including switching means for selectively switching said calibrating signal and gyroscope signal into said indicating apparatus, said indicating apparatus including a plurality of variable circuit elements for calibrating the indicating apparatus while the signal simulating means is connected thereto, said signal simulating means also including three additional lamps of different colors corresponding respectively to the colors of the lamps in said indicating apparatus, said additional three lamps being energized simultaneously with the other lamps respectively and providing a convenient indication for an operator calibrating the instrument.

11. In apparatus of the character disclosed for use on aircraft, in combination, gyroscope means including an adjustable zero set autosyn mounted on the aircraft for obtaining a gyroscope signal having a polarity corresponding to the direction of deviation of the instant pitch angle of the aircraft from a preselected pitch angle, and having a magnitude proportional to the amount of said deviation, said gyroscope means including a source of A. C. potential and a source of D. C. potential, pitch indicating apparatus adapted to be detachably connected to said gyroscope means, said pitch indicating apparatus including electronic amplifier means having an input gain control, and differential relay means having a variable resistor control, said indicating apparatus also including three lamps of different colors, said indicating apparatus being so constructed and arranged that, while connected to the gyroscope means, said gyroscope signal is utilized to control the relay means and selectively connect said lamps to said D. C. source in accordance with the amount and direction of deviation of the aircraft from said preselected pitch angle, and detachable signal simulating means adapted to be interconnected between the gyroscope means and the indicating apparatus, said signal simulating means being energized from said source of A. C. potential and including a selsyn device having a variable coupling ratio to provide a variable calibrating signal, said signal simulating means including switching means for selectively switching said calibrating signal and gyroscope signal into said indicating apparatus, said input gain control and variable resistor control providing for calibrating the indicating apparatus while the signal simulating means is connected thereto, said signal simulating means also including three additional lamps of different colors corresponding respectively to the colors of the lamps in said indicating apparatus, said additional three lamps being energized simultaneously with the other lamps respectively and providing a convenient indication for an operator calibrating the instrument.

12. In apparatus of the character disclosed for use on aircraft, in combination, gyroscope means including an adjustable zero set autosyn mounted on the aircraft for obtaining a gyroscope signal having a polarity corresponding to the direction of deviation of the instant pitch angle of the aircraft from a preselected pitch angle, and having a magnitude proportional to the amount of said deviation, said gyroscope means including a source of A. C. potential and a source of D. C. potential, pitch indicating apparatus adapted to be detachably connected to said gyroscope means, said pitch indicating apparatus including electronic amplifier means having a pair of balanced amplifier tubes and having an input gain control, and differential relay means having a variable resistor control, said indicating apparatus also including three lamps of different colors, said indicating apparatus being so constructed and arranged that, while connected to the gyroscope means, said gyroscope signal is utilized to control the relay means and selectively connect said lamp to said D. C. source in accordance with the amount and direction of deviation of the aircraft from said preselected pitch angle, and detachable signal simulating means adapted to be interconnected between the gyroscope means and the indicating apparatus, said signal simulating means being energized from said source of A. C. potential and including a selsyn device having a variable coupling ratio to provide a variable calibrating signal, said signal simulating means including switching means for selectively switching said calibrating signal and gyroscope signal into said indicating apparatus, said signal simulating means including meter means for measuring the currents in the anode circuits of said two tubes, said input gain control and variable resistor control providing for calibrating the indicating apparatus while the signal simulating means is connected thereto, said signal simulating means including three additional lamps of different colors corresponding respectively to the colors of the lamps in said indicating apparatus, said additional three lamps being energized simultaneously with the other lamps respectively and providing a convenient indication for an operator calibrating the instrument.

ARCHIBALD JOHN McEWAN.

No references cited.